United States Patent
Mattsson et al.

(10) Patent No.: US 10,284,531 B2
(45) Date of Patent: *May 7, 2019

(54) COLLISION AVOIDANCE IN A DISTRIBUTED TOKENIZATION ENVIRONMENT

(71) Applicant: Protegrity Corporation, Grand Cayman (KY)

(72) Inventors: Ulf Mattsson, Cos Cobs, CT (US); Zvika Ferentz, Rye-Brook, NY (US)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,485

(22) Filed: Aug. 1, 2018

(65) Prior Publication Data
US 2018/0337897 A1 Nov. 22, 2018

Related U.S. Application Data

(63) Continuation of application No. 15/607,439, filed on May 27, 2017, now Pat. No. 10,063,525, which is a
(Continued)

(51) Int. Cl.
*H04L 29/06* (2006.01)
*G06F 21/33* (2013.01)

(52) U.S. Cl.
CPC ........ *H04L 63/0428* (2013.01); *G06F 21/335* (2013.01); *H04L 63/04* (2013.01);
(Continued)

(58) Field of Classification Search
CPC .............. H04L 63/0428; H04L 63/0807; H04L 63/04; H04L 63/08; H04L 2463/101; G06F 21/335
See application file for complete search history.

(56) References Cited

U.S. PATENT DOCUMENTS 6,421,013 B1 7/2002 Chung
2006/0036237 A1 2/2006 Davison et al.
(Continued)

FOREIGN PATENT DOCUMENTS

EP 2363839 A2 9/2011

OTHER PUBLICATIONS

Anonymous: "Intelligent PCI Compliance Solution Protects Transaction Data and Enhances Retail Brands," Dec. 31, 2012, 12 pages, [Online] [Retrieved on Jan. 28, 2015] Retrieved from the Internet<URL:https://web.archive.org/web/20150128145208/http://www.intel.de/contenUdam/www/public/us/en/documents/solution-briefs/intel-bluepri- nt- intelligent-pci-compliance-final.pdf>.
(Continued)

*Primary Examiner* — Meng Li
(74) *Attorney, Agent, or Firm* — Fenwick & West LLP

(57) ABSTRACT

A client receives sensitive data to be tokenized. The client queries a token table with a portion of the sensitive data to determine if the token table includes a token mapped to the value of the portion of the sensitive data. If the mapping table does not include a token mapped to the value of the portion of the sensitive data, a candidate token is generated. The client queries a central token management system to determine if the candidate token collides with a token generated by or stored at another client. In some embodiments, the candidate token includes a value from a unique set of values assigned by the central token management system to the client, guaranteeing that the candidate token does not cause a collision. The client then tokenizes the sensitive data with the candidate token and stores the candidate token in the token table.

18 Claims, 5 Drawing Sheets

Related U.S. Application Data continuation of application No. 15/080,589, filed on Mar. 25, 2016, now Pat. No. 9,699,149, which is a continuation of application No. 14/042,325, filed on Sep. 30, 2013, now Pat. No. 9,313,195.

(52) U.S. Cl.
CPC .......... *H04L 63/08* (2013.01); *H04L 63/0807* (2013.01); *H04L 2463/101* (2013.01)

(56) References Cited

U.S. PATENT DOCUMENTS

| | | | |
|---|---|---|---|
| 2007/0126586 | A1 | 6/2007 | Ohtaka |
| 2011/0044321 | A1 | 2/2011 | Rosenberg et al. |
| 2011/0099384 | A1* | 4/2011 | Grange ................ H04L 9/0897 713/184 |
| 2011/0154466 | A1 | 6/2011 | Harper et al. |
| 2011/0213807 | A1* | 9/2011 | Mattsson ............ G06F 21/6245 707/802 |
| 2011/0226511 | A1 | 9/2011 | Matsushita |
| 2011/0240482 | A1 | 10/2011 | Satou et al. |
| 2012/0304273 | A1* | 11/2012 | Bailey .................. H04L 9/0891 726/9 |
| 2012/0324555 | A1 | 12/2012 | Chambers et al. |
| 2013/0198851 | A1 | 8/2013 | Spies et al. |
| 2013/0212007 | A1 | 8/2013 | Mattsson et al. |

OTHER PUBLICATIONS

Anonymous: "Tokenization Manager—Reducing Regulatory Scope Solution Brief," Jul. 13, 2011, 4 pages, [Online] [Retrieved on Jan. 29, 2015] Retrieved from the Internet<URL:http://www.safenet-inc. com/WorkArea/linkit.aspx?LinkIdentifier=id&ItemID=8589944243 &oaID=8589949441&ctaID=8589945176>.

Australian Examination Report, Australian Application No. 2016201708, dated Feb. 10, 2017, 2 pages.

Australian First Examination Report, Australian Application No. 2014240197, dated Aug. 21, 2015, 3 pages.

Australian Second Examination Report, Australian Application No. 2014240197, dated Feb. 9, 2016, 3 pages.

European Examination Report, European Application No. 14187021.2, dated Apr. 19, 2018, 6 pages.

European Extended Search Report, European Application No. 14187021.2, dated Feb. 9, 2015, 8 pages.

Mattsson, U., "Ulf Mattsson, CTO Protegrity: A New Scalable Approach to Data Tokenization—Global Security Mag Online," Jun. 20, 2010, 4 pages, [Online] [Retrieved on Jan. 28, 2015] Retrieved from the Internet<URL:http://www.globalsecuritymag. com/Ulf-Mattsson-CTO-Protegrity-A- New,20100620, 18174. html>.

Scoping SIG, Tokenization Taskforce PCT Security Standards Council, "Information Supplement: PCI DSS Tokenization Guidelines," Standard: PCI Data Security Standard (PCI DSS), Aug. 31, 2011, 24 pages, [Online] [Retrieved on Jan. 26, 2015] Retrieved from the Internet<URL:http://www.pcisecuritystandards.org/documents/Tokenizatio- n.sub.-- Guidelines Info Supplement.pdf>.

United States Office Action, U.S. Appl. No. 14/042,325, dated Feb. 23, 2015, 14 pages.

United States Office Action, U.S. Appl. No. 14/042,325, dated Jul. 22, 2015, 13 pages.

United States Office Action, U.S. Appl. No. 14/798,266, dated Dec. 23, 2016, 16 pages.

United States Office Action, U.S. Appl. No. 15/080,589, dated Feb. 23, 2017, 11 pages.

United States Office Action, U.S. Appl. No. 15/607,439, dated Apr. 25, 2018, 15 pages.

\* cited by examiner

COLLISION AVOIDANCE IN A DISTRIBUTED TOKENIZATION ENVIRONMENT

CROSS REFERENCE TO RELATED APPLICATIONS

This application is a continuation of U.S. application Ser. No. 15/607,439, filed May 27, 2017, now U.S. Pat. No. 10,063,525, which is a continuation of U.S. application Ser. No. 15/080,589, filed Mar. 25, 2016, now U.S. Pat. No. 9,699,149, which is a continuation of U.S. application Ser. No. 14/042,325, filed Sep. 30, 2013, now U.S. Pat. No. 9,313,195, which is incorporated by reference in its entirety.

FIELD OF ART

This application relates to the field of data protection, and more specifically to the protection of information using dynamic tokenization.

BACKGROUND

Many websites, services, and applications implement various data protection techniques. Certain techniques involve the use of an encryption key or password that can be subject to interception or brute force guessing. Other methods may protect data but require extensive computing resources to encode and decode data. Such methods often fail to utilize various data format advantages when protecting the data. Often, distinct systems implementing data protection techniques are required to store information associated with the protected data within distinct repositories or databases. Thus, it may be advantageous to implement data protection techniques that utilize distinct information storage locations in such a way as to minimize the processing and storage burden across a data protection system as a whole while improving security and tracking potential data use information and collisions.

SUMMARY

A central token management system manages tokens generated by clients in a distributed tokenization environment to avoid collisions between tokens generated by different clients.

A client receives sensitive data to be tokenized. A token table associated with the client is queried with a portion of the sensitive data. If the token table includes a token mapped to the sensitive data, the token is returned and used to tokenize the sensitive data. Otherwise if the token table does not include a token mapped to the value of the portion of the sensitive data, the client generates a candidate token. When generating new entries tokens in a distributed tokenization environment, collisions between tokens generated by different clients in the distributed tokenization environment should be avoided.

One way in which collision avoidance can be implemented is through the use of a central token management system to determine whether a generated candidate token causes a collision with a token generated by or stored at another client. Before the candidate token is used to tokenize the received data, the client determines whether the candidate obtained token causes a collision with tokens generated by other clients. The client queries a central token management system to determine if a collision exists between the candidate token and tokens generated by other clients. If the candidate token does not cause a collision, the candidate token is used to tokenize the received data, the client stores the candidate token in the token table, and the client sends the candidate token to the central token management system so that other clients do not generate tokens that collide with the candidate token.

If the candidate token does cause a collision with a token generated by another client, a new candidate token is generated, and a determination of whether the new candidate token causes a collision with tokens generated by other clients is made. This process can be repeated until a token is generated that does not cause a collision with any of the tokens generated by other clients.

Another way token collision avoidance can be implemented is by restricting the tokens each client can generate to a set of values unique to each client. In some embodiments, the central token management system assigns each client a unique range or set of candidate token values. For example, the central token management system may assign each client a unique numeric seed value, and can assign each client a range of values beginning with the unique numeric seed value. In such embodiments, when a client receives sensitive data to be tokenized, and the client determines that a token table associated with the client does not include a token mapped to the value of a portion of the data, the client can generate a candidate token within the range of candidate token values assigned to the client.

As the range of candidate token values assigned to the client is unique to the client, the generated candidate token will not cause a collision with tokens generated by the other clients assigned a unique range of candidate token values by the central token management system. Accordingly, the client can tokenize the sensitive data with the generated token, can store the generated token in the token table associated with the client, and can provide the generated token to the central token management system for subsequent token use analysis and tracking.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
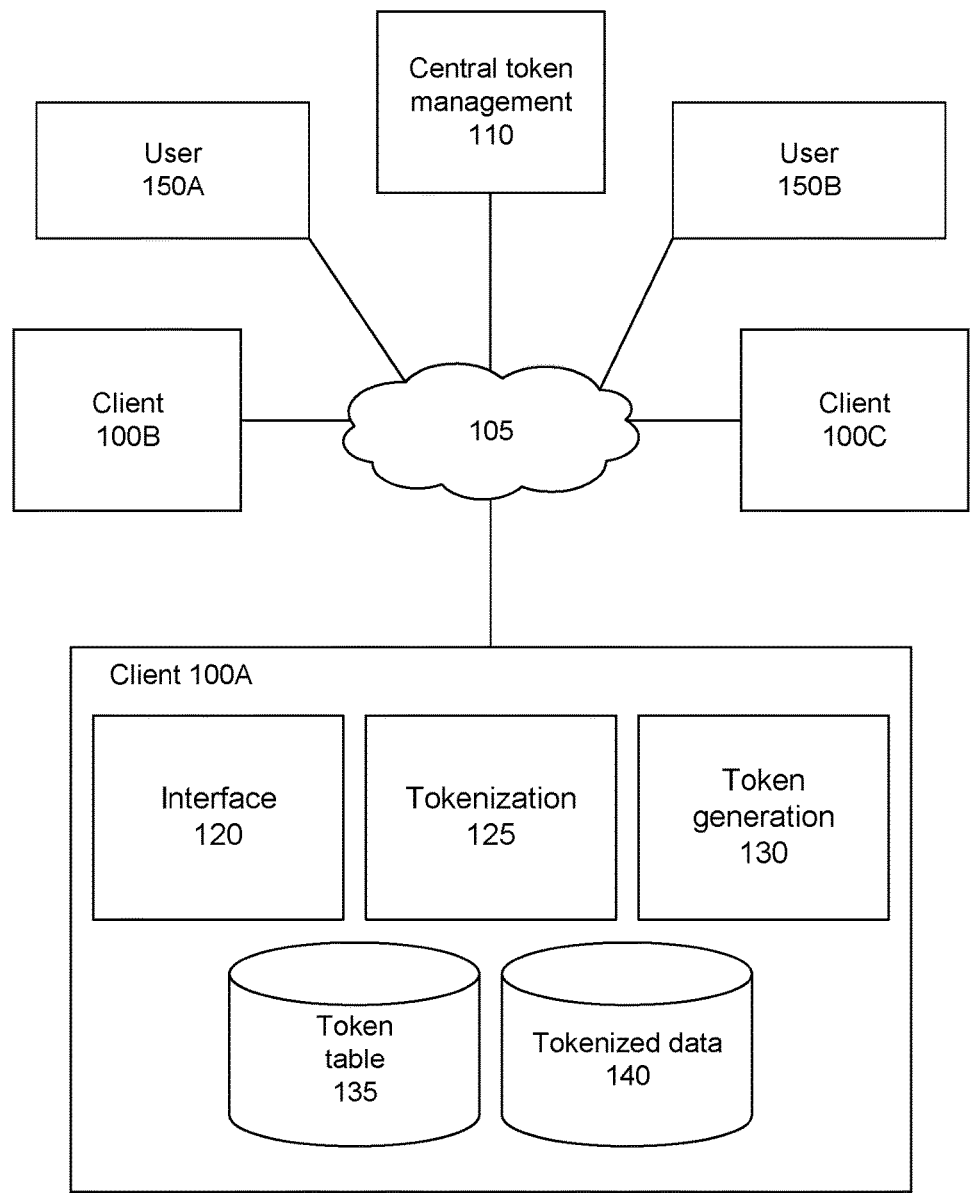
FIG. 1 is a system diagram for a distributed tokenization environment, according to one embodiment.

The figures (FIGS.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Tokenization Overview

The transmission and storage of sensitive data, such as passwords, credit card numbers, social security numbers, bank account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token value is generated and included in a token table entry each time sensitive data is tokenized. The new token value can be generated randomly, can be randomly selected from among a set of values, or can be generated via any other suitable means. A seed value can be used to generate token values, to select a set of values from which to select a token value from among multiple sets of values, or to randomly select a value from among a set of values for use as the token value. It should be noted that as used herein, "randomly" can refer to pseudo-randomly or substantially randomly. The seed value can include a portion of data being tokenized.

In some embodiments, a DLT can map portions of sensitive data being replaced by a token to a token. The DLT can include the entire sensitive data (including portions of the sensitive data that are not replaced by a token), and the DLT can indicate the portion of the sensitive data being replaced by the token and can map the portion to the token. DLTs can in some configurations provide a higher level of security compared to SLT but require the storage and/or transmission of a large amount of data associated with each of the generated token tables. It should be noted that DLT tokenization can be used to tokenize data according to the principles described above with regards to SLT tokenization.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

To detokenize tokenized data, a portion of the tokenized data including a token is used to query a token table, and a value mapped to the token within the token table is used to replace the portion of the tokenized data including the token. If multiple values are mapped to the same token, a detokenization system will be unable to identify which value mapped to the token to use in detokenizing the tokenized data. More than one value mapped within a token table or within a distributed tokenization environment is referred to herein as a "token collision".

For instance, the values "123456 123456 1234" and "45678 45678 1234" are each mapped within a token table to the token "95173 95173 1234", then when detokenizing the tokenized data "95173 95173 1234", a detokenization system will be unable to select between the value "123456 123456 1234" and "45678 45678 1234". As a result, the sensitive data represented by the tokenized data "95173 95173 1234" is irrecoverable.

Figure 3:
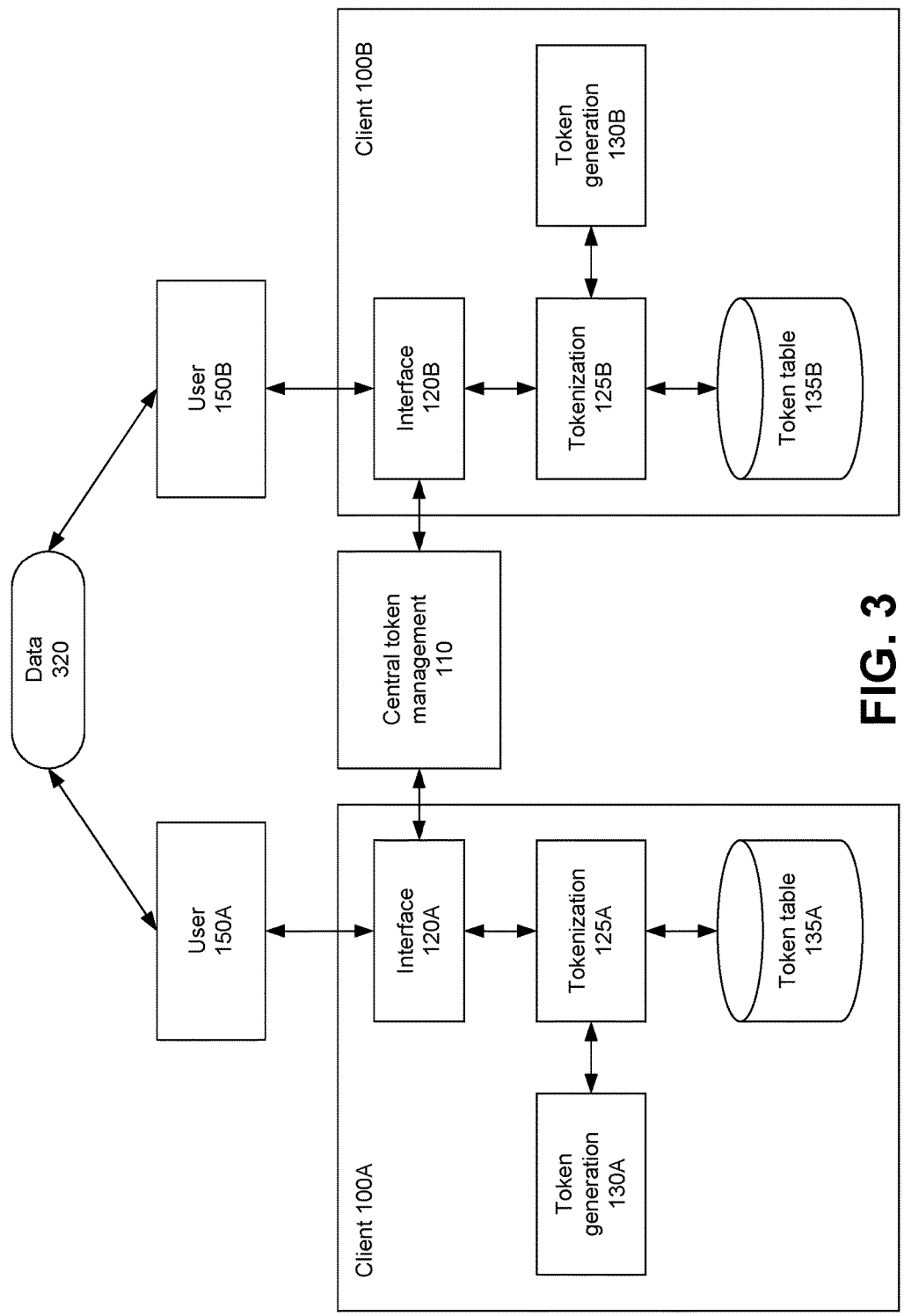
FIG. 3 illustrates a diagram of a distributed tokenization environment, according to one embodiment.

In a distributed tokenization environment, such as the environments of FIGS. 1 and 3, each client 100 can generate and store a set of tokens. If, within the distributed tokenization environment, more than one set of tokens stored by the clients include a particular token, a potential token collision exists within the distributed tokenization environment.

Tokenization System Overview

FIG. 1 is a system diagram for a distributed tokenization environment, according to one embodiment. The environment of FIG. 1 includes a plurality of clients 100A, 100B, and 100C ("clients 100" hereinafter), and a central token management system 110, communicatively coupled via a network 105. Each client 100 can be a retailer, business, or other organization, though it should be noted that clients can also be individual users or any other suitable entity. An entity can receive sensitive data, for instance a credit card number or other account number during the course of a transaction with a user, and tokenize all or part of the sensitive data, for instance prior to storage or transmission. It should be noted that while three clients 100 are illustrated in the embodiment of FIG. 1, other embodiments of the system environment can contain any number of clients and/or other components.

A client 100 can include a computing device capable of processing data as well as transmitting data to and receiving data from the other modules of FIG. 1 via the network 105. For example, the client can include a desktop computer, laptop computer, smart phone, tablet computing device, server, payment terminal, or any other device having computing and data communication capabilities. Each computing device includes one or more processors, memory, storage, and networking components. Each client is coupled to the network and can interact with other modules coupled to the network using software such as a web browser or other application with communication functionality. Such software can include an interface for communicating with the other modules via the network.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

Each client 100 in the embodiment of FIG. 1 includes an interface module 120, a tokenization module 125, a token generation module 130, a token table 135, and a tokenized data module 140. The interface module 120 is configured to provide an interface between entities external to the client and modules within the client. For instance, the interface module can provide an interface prompting a customer to swipe a credit card, and can transfer the credit card number received in response to the tokenization module 125 for tokenization. The interface module can provide a graphic user interface (GUI) to entities external the client (for instance, via a display or a web page), and/or can provide a communicative interface configured to automatically route received sensitive data. The interface module 120 can also provide an interface for communications between modules of the client, for instance routing generated tokens to the token tables storage module and tokenized data to the tokenized data storage module. The interface module 120 can also receive requests for information associated with token tables stored in the token tables storage module from the central token management system 110, can query the token tables storage module in response, and can provide information received in response to the query to the central token management system.

The tokenization module 125 is configured to receive sensitive data, to tokenize all or part of the received sensitive data, and to store or transmit the tokenized data. In the embodiments described herein, the tokenization module 125 performs DLT tokenization, though it should be noted that other forms of tokenization can also be performed according to the principles described herein. The tokenization module 125 selects a portion of the sensitive data to tokenize, and queries the token table 135 to determine if the token table includes a token mapped to the value of the portion of the sensitive data. In response to the token table including such a token, the tokenization module 125 can tokenize the sensitive data with the token, for instance by replacing the portion of the sensitive data with the token.

In response to a determination that the token table 135 does not include a token mapped to the value of the portion of the sensitive data, the tokenization module 125 requests a token from the token generation module 130. The token generation module 130 is configured to generate a random token value, for example by randomly selecting a token from a set of pre-generated token values, requesting and receiving a token from an external entity (such as the central token management system 110), or can generate a token via any other suitable token generation means, such as a token generation function. As noted above, the token generation module 130 can receive a seed value, such as an initialization vector, for use in generating or selecting a token. The seed value can include a portion of the sensitive data, or can be associated with the context of the tokenization operation (for instance, the identity of a user of the client 100A, the time/date of the tokenization request, and the like).

Upon receiving the generated candidate token, the tokenization module 125 determines whether a collision exists between the candidate token and a token generated by another client coupled to the central token management system 110. The tokenization module 125 can query the central token management system 110 with the candidate token, and in response, the central token management system 110 can determine if the value of the candidate token is equivalent to the value of a token generated by another client or stored in the token table of another client. In some embodiments, the central token management system 110 queries each client with the candidate token, and each client informs the central token management system 110 of whether a collision exists between the candidate token and a token stored at the client. In other embodiments, the central token management system 110 stores a copy (or other indicia, e.g., a hash value) of each token generated by or stored at each client in a master token table or token tables, and the central token management system makes a determination of whether the candidate token causes a collision by querying the master token table or token tables with the candidate token or indicia, and provides a response to the token management system 110 indicating the result of the determination. In response to a determination from the token management system 110 that the candidate token causes a collision with another token generated by or stored at another client, the tokenization module 125 can request a new candidate token from the token generation module 130, and the process of determining whether the new candidate token causes a collision is repeated until a candidate token that does not cause a collision is generated. Otherwise, where the token management system 110 indicates that token does not cause a collision, the tokenization module 125 uses the token to tokenize the sensitive data, and returns the tokenized data to the interface module 120.

It should be noted that in embodiments described further herein, the token generation module 130 generates or selects a candidate token from among a set of potential candidate token values unique to the client 100A. For instance, the central token management system can assign a unique set of potential candidate token values to each client, using an identifier value for the client as a starting point for a range of token values. For example, for a client associated with the unique identifier "01", the central token management system can assign the client the set of potential candidate token values ranging from "01 000 000" to "01 999 999", and for a client associated with the unique identifier "36", the central token management system can assign the client the set of potential candidate token values ranging from "36 000 000" to "36 999 999". In such embodiments, since the potential range of candidate token values is unique to each client, the candidate token generated by the token generation module 130 is unique to the client 100A, and does not cause a collision with a token generated by or stored at another client.

After the receiving a candidate token from the token generation module 130 and determining that the token does not cause a collision with a token generated by or stored at another client, the tokenization module 125 can tokenize the sensitive data with the token. For instance, the tokenization module 125 can replace the selected portion of the sensitive data with the received token to form tokenized data. For instance, if the middle eight digits of a credit card number "1234 5678 9012 3456", and the generated token is "99887766", the tokenization module 125 can replace the middle eight digits with the token to form the tokenized data "1234 9988 7766 3456". The tokenization module 125 can store the received token and the association between the token and the value of the replaced portion of sensitive data in the token table 135. Continuing with the previous example, the tokenization module can store a mapping between the value "56789012" and the token "99887766" in the token table 135.

After tokenizing the sensitive data, the tokenization module 125 can store the sensitive data in the tokenized data storage module 140, or can transmit the tokenized data to an external entity (such as a bank, payment processor, retailer, financial institution, and the like). Although not described further herein, tokenized data can be subsequently accessed, for instance from the tokenized data storage module 140. The tokenized data can be detokenized by accessing the token used to tokenized the data from the token table 135, and replacing the portion of the tokenized data that includes the token with the value mapped to the token within the token table to form detokenized data.

The central token management system 110 can interface with the clients 100 to perform a variety of pre- and post-tokenization operations. For instance, the central token management system 110 can track and/or store tokens stored within token tables at each client within a master token table or token tables. Each time a client generates a new token, the client can provide the new token to the central token management system 110, and the central token management system can update the master token table or token tables to include the new token. The central token management system 110 can be queried by a client to determine if a newly generated token collides with a token generated by or stored at another client. The central token management system 110 can also track duplicate tokens (different tokens in different token tables at different clients mapped to the same data portion value), and can store the duplicate tokens and associated information for subsequent auditing/analysis. In some embodiments, instead of storing duplicate tokens, a hash representative of each token or a reference to a token table is stored at the central token management system 110. The central token management system 110 can also synchronize tokens stored within token tables at different clients, and can track where each token is created, the circumstances of the creation of the token, the use of each token, and any other information associated with the tokens, the clients, or tokenization operations. As noted above, the central token management system 110 can assign a unique set of potential candidate token values to each client. Accordingly, when generating a new candidate token, each client can be configured to generate a candidate token value within the set of potential candidate token values such that each new candidate token generated by a client will not cause collisions with tokens generated by or stored at another client.

Figure 2:
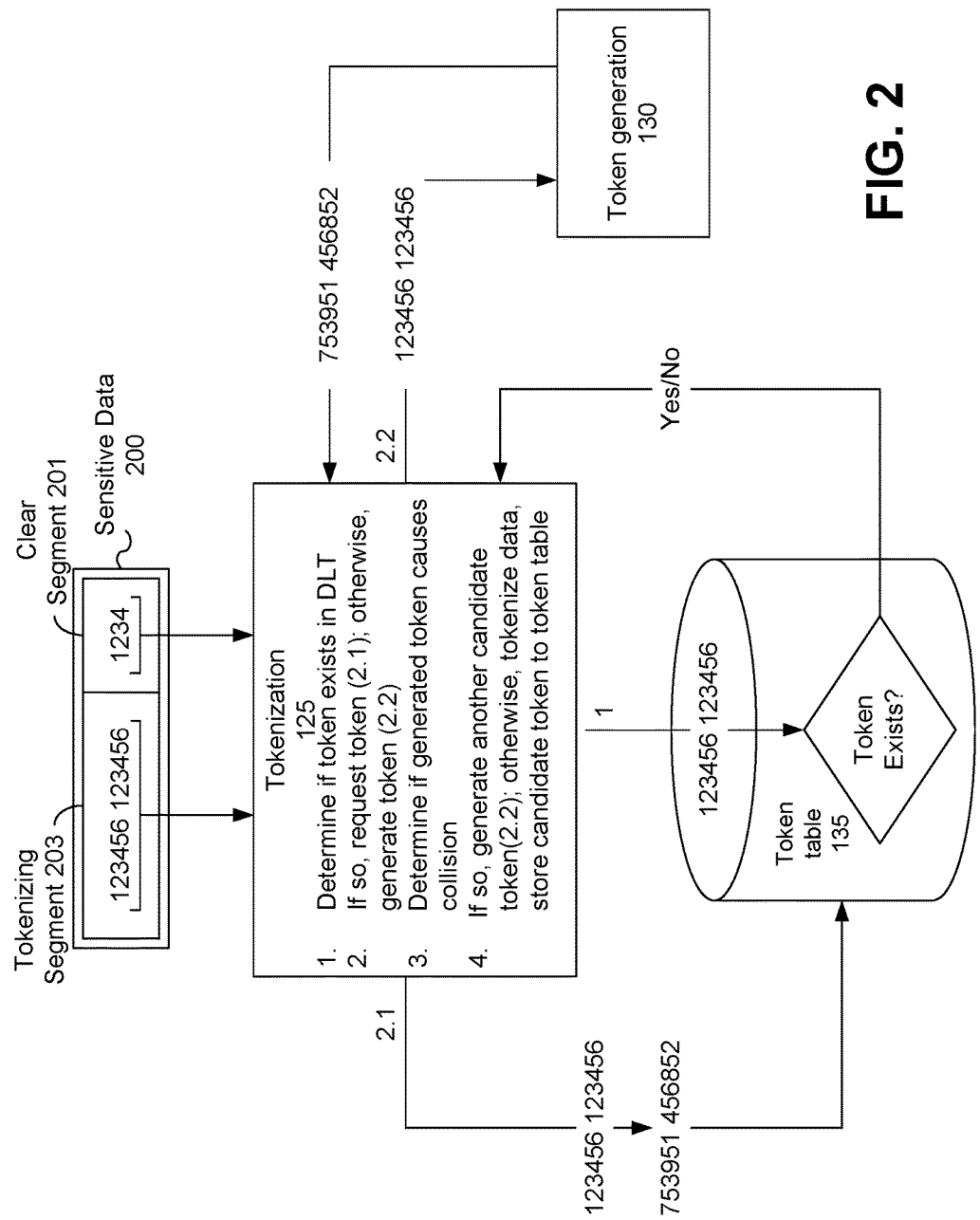
FIG. 2 illustrates data flow within a tokenization system, according to one embodiment.

FIG. 2 illustrates an example data flow within the tokenization system of FIG. 1, according to one embodiment. The tokenization module 125 receives sensitive data 200. In FIG. 2, the sensitive data 200 includes the string "123456 123456 1234", which includes two segments, a first segment (the "tokenizing segment" 203) that includes the value "123456 123456," and a second segment (the "clear segment" 201) that includes the value "1234." The clear segment 201 can be used to select a token table from among a plurality of token tables, can be used to modify the tokenizing segment 203, can be used to query an IV table to retrieve an IV for use in tokenization, or can be used for any other suitable purpose within the context of the tokenization operations described herein.

The tokenization module 125 queries the token table 135 with the value of the tokenizing segment 203. If the token table 135 includes a token mapped to the value of the tokenizing segment 203, the token table 135 outputs the token to the tokenization module 125. The tokenization module 125 tokenizes the sensitive data 200 using the token, for instance by replacing the tokenizing segment 203 with the token, to form tokenized data. In FIG. 2, the value of the tokenizing segment, "123456 123456" is mapped to the token "753951 456852", and the value of the tokenized data is the "753951 456852".

If the token table 135 does not include a token mapped to the value of the tokenizing segment 203, the tokenization module requests and receives a candidate token from the token generation module 130. In response to receiving the candidate token from the token generation module 130, the tokenization module 125 determines if a collision exists between the candidate token and a token generated at or stored by another client. To do so, the tokenization module 125 can query a central token management system 110 with the candidate token, and the central token management system can determine if the candidate token causes a collision with another token generated by or stored at another client communicatively coupled to the central token management system. If the candidate token does cause a collision, the tokenization module 125 can request a new candidate token, and the process can be repeated until a candidate token is received that does not cause a collision. Upon receiving a candidate token that does not cause a collision, the tokenization module 125 can tokenize the sensitive data with the candidate token, and can store the candidate token and the association between the candidate token and the value of the tokenizing segment 203 in the token table 135.

As discussed above, in embodiments where the central token management system 110 provides a unique set of potential candidate token values to each client, the token generation module 130 can generate a candidate token having a value within an assigned unique set of potential candidate token values, guaranteeing that the candidate token will not cause a collision with a token generated by or stored at another client, and precluding the need for the tokenization module 125 to check for collisions.

FIG. 3 illustrates a system diagram for a distributed tokenization environment, according to one embodiment. The environment of FIG. 3 includes a first user 150A and a second user 150B. The first user 150A uses client 100A to tokenize and detokenize sensitive data. The second use 150B uses client 100B to tokenize and detokenize sensitive data. In some embodiments, user 150A and user 150B communicate with each other via the network 105. For instance, user 150A may use client 100A to tokenize sensitive data, and to send the tokenized data to user 150B. User 150B receives the tokenized data and detokenizes the tokenized data using client 100B to obtain the sensitive data. It should be noted that User 150A and User 150B can refer to people, businesses, entities, or the like.

Since user 150B uses client 100B to detokenize the tokenized data tokenized by client 100A, the token table 135B of client 100B may not initially include a token used by the client 100A to tokenize the sensitive data and required by client 100B to detokenize the tokenized data. Client 100B can query the central token management system 110 to determine if another client 100 stores the token required to detokenize the tokenized data. In response, the central token management system 110 determines that the token table 135A of client 100A includes the token used to tokenize the data. In some embodiments, the central token management system 110 sends a response to client 100B notifying client 100B that the client 100A stores the required token, and client 100B can request the required token directly from client 100A. In other embodiments, the central token management system 110 acquires the required token from the client 100A and provides the required token to the client 100B. Upon receiving the required token, the client 100B detokenizes the tokenized data and can store the required token in the token table 135B.

Collision Avoidance Through Central Token Management

Token collision avoidance can be implemented within a distributed tokenization environment through the use of a central token management system 110. The central token management system 110 can maintain a master token table storing tokens generated by different clients 100 communicatively coupled to the central token management system, or can be configured to query the coupled clients to identify potential collisions with tokens stored by the clients. When a client generates a new candidate token, the client can query the central token management system 110 to determine if the newly generated token causes a collision with a token from another client. If a client determines (for instance, based on feedback from the central token management system) that the candidate token causes a collision with another token within the distributed tokenization environment, the client can generate a different candidate token until a candidate token that does not cause a collision is generated.

Figure 4:
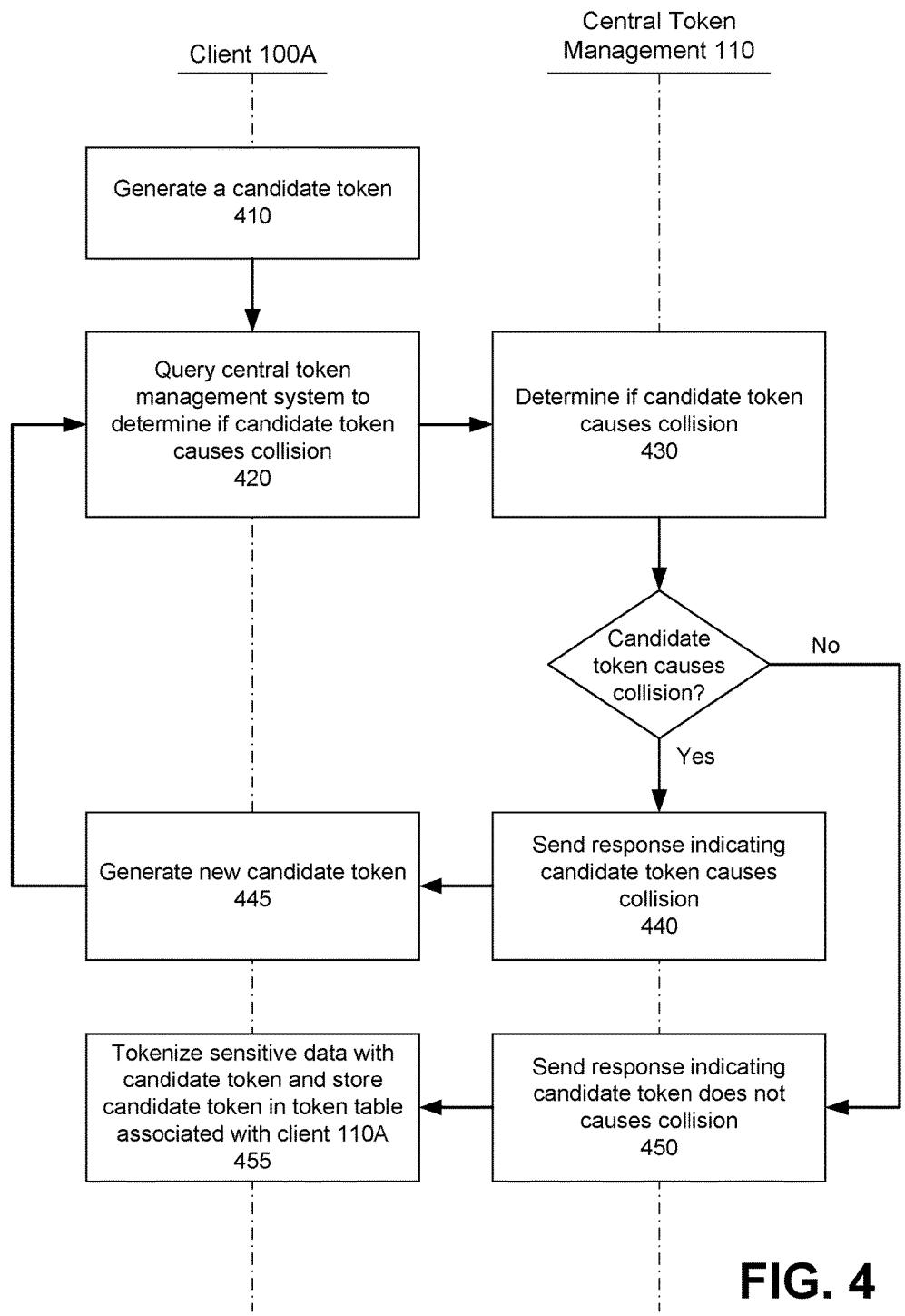
FIG. 4 illustrates a flow diagram of a process for avoiding token collisions in a distributed tokenization environment by using a central token management system, according to one embodiment.

FIG. 4 illustrates a flow diagram of a process for avoiding token collisions in a distributed tokenization environment by using a central token management system, according to one embodiment. The client 100A generates 410 a candidate token and queries 420 the central token management system 110 to determine if the candidate token causes a collision with token generated at or stored by any other client communicatively coupled to the central token management system. The central token management system 110 receives the request and determines 430 if the candidate token causes a collision. As noted above, the central token management system 110 can search a master token table storing tokens generated by other clients in the distributed tokenization environment for a token equivalent to the candidate token to determine if the candidate token causes a collision. Alternatively, the central token management system 100 can query other clients with the candidate token to determine if any client stores a token equivalent to the candidate token.

If the central token management system 110 determines that the candidate token does not cause a collision, a response is sent 450 to the client 100A indicating that the candidate token does not cause a collision with any tokens generated by or stored at any other client in the tokenization system. The client 110A can then tokenize 455 sensitive data using the candidate token, and can store the candidate token in a token table associated with the client 100A. In addition, the client 100A can provide the candidate token to the central token management system 110 for inclusion in the master token table stored by the central token management system 110 for subsequent use in collision determinations with future candidate tokens generated by other clients.

If the central token management system 110 determines that the candidate token causes a collision, a response is sent 440 to the client 100A indicating that the candidate token causes a collision with token generated by or stored at another client. In response, the client 100A generates 445 a new candidate token, and the central token management system is queried 420 with the new candidate token to determine if the new candidate token causes a collision. This process is repeated until a candidate token generated that does not cause collisions with tokens generated by or stored at other clients in the distributed tokenization environment.

It should be noted when determining if a candidate token causes a collision, additional information can be considered. For instance, if a token table stores tokens, portions of sensitive data to which the tokens are mapped, and a clear text portion of sensitive data that is not replaced with a token, the clear text portion can be used as an index in determining if a token causes a collision. For example, for a sensitive data string "123456 789012 3456", a first client can generate a token "753951 924641", and can store an association between the sensitive data portion "123456 789012", the token "753951 924641", and the last four digits "3456" as a clear text index in a token table associated with the first client. Continuing with this example, for a sensitive data string "098765 432109 8765", a second client can generate the same candidate token "753951 924641", and can query the central token management system 110 with the candidate token and the last four digits "8765" as a clear text index. Although the candidate token is the same as the token previously generated by the first client, because the clear text index is different, the central token management system 110 is able to distinguish between the candidate token and the token, and the candidate token does not cause a collision within the distributed tokenization environment.

Collision Avoidance by Restricting Allowed Tokens

Token collision avoidance can be implemented within a distributed tokenization system by restricting the values of tokens that each client in the distributed tokenization environment can generate. For instance, a client 100A can be limited to generating tokens that start with the value "01", a client 100B can be limited to generating tokens that start with the value "02", and a client 100C can be limited to generating tokens that start with the value "03." Since client 100B and client 100C cannot generate tokens that start with "01," tokens generated by client 100B and client 100C will not collide with tokens generated by client 100A.

Restricting the tokens generated by clients can be implemented in many different ways. For example, tokens can be restricted to starting with a specific value, ending with a specific value, or including a specific value in the middle of the token. In some embodiments, each client in a distributed tokenization environment is associated with a unique identifier, and the tokens generated by each client are restricted to values that begin with, end with, or include the unique identifier. Alternatively, an algorithm used to generate tokens can be designed such that tokens generated by different clients do not collide.

Restricting the tokens a client can generate enables the client to generate candidate tokens even during times when the client cannot query the central token management system 110 to determine if a candidate token causes a collision within the distributed tokenization environment. For instance, if the central token management system 110 is offline, is busy and/or irresponsive, or if time constraints prohibit waiting for the central token management system 110 to respond to a collision query, a client can generate a token unique to the client, guaranteeing that the token does not cause a collision without requiring the client to query the central token management system.

In one embodiment, the central token management system 110 assigns each client in the distributed tokenization environment a unique range or set of allowable token values. For example, the central token management system 110 can assign a client 100A a set of possible token values that are 8 digits long and that start with the value "21". As a result, the client 100A can only generate tokens that fall between the range "21000000" and "21999999". Similarly, the central token management system 110 can assign a client 100B a set of possible token values that are 8 digits long and that start with the value "33". As a result, the client 110B can only generate tokens that fall between the range "33000000" and "33999999". Accordingly, any token generated by the client 100A will not collide with any token generated by the client 100B, and vice versa. If a client generates one token for each value in the set of possible token values assigned by the central token management system 110, the client can request additional possible token values from the central token management system. Continuing with the previous example, if the client 100A requests additional possible token values, the central token management system 110 can assign the client 100A an additional set of possible token values that are 8 digits long and that start with the value "46".

Figure 5:
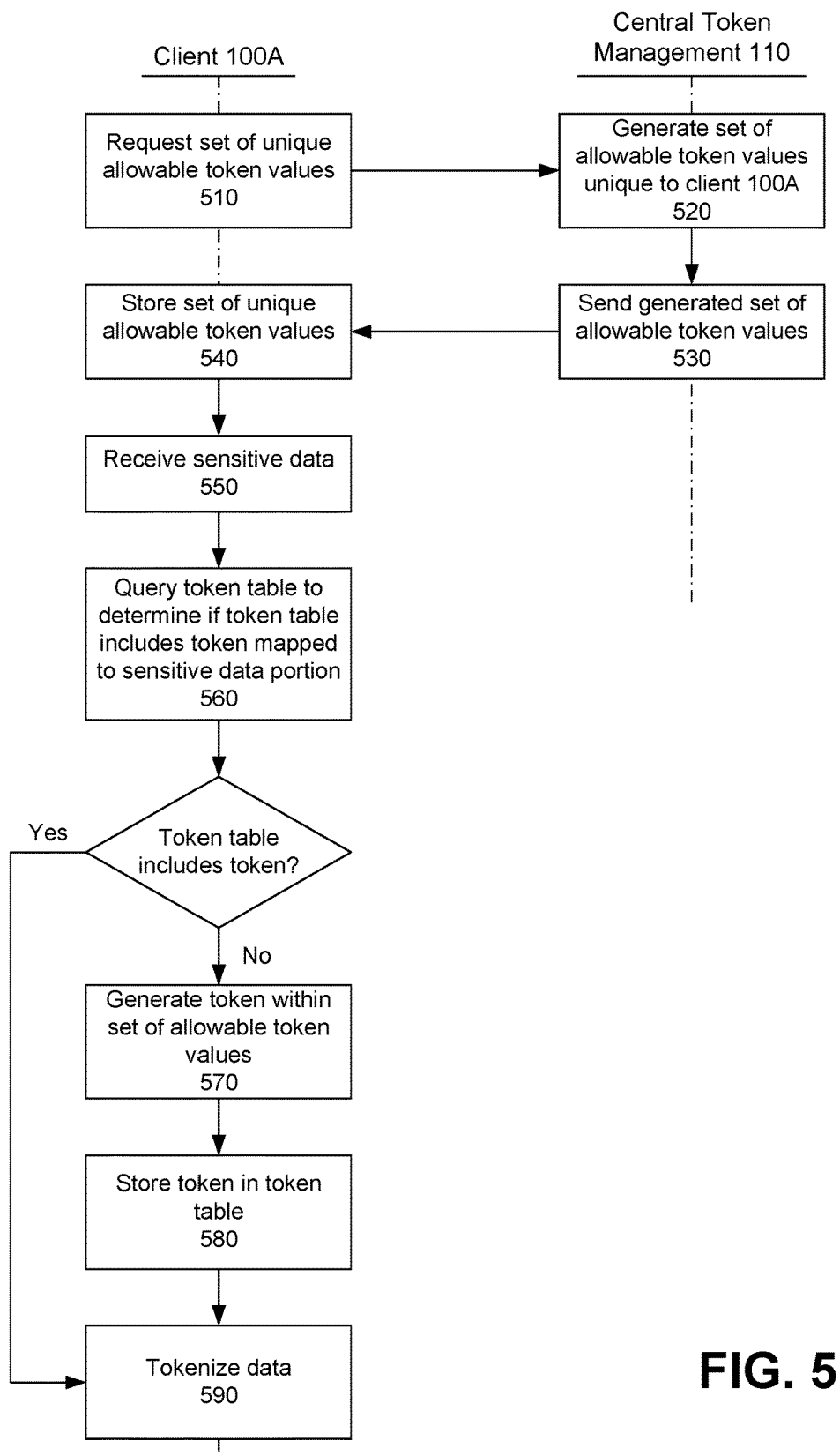
FIG. 5 illustrates a flow diagram of a process for avoiding token collisions in a distributed tokenization environment by restricting values for candidate tokens to a set of values unique to each client, according to one embodiment.

FIG. 5 illustrates a flow diagram of a process for avoiding token collisions in a distributed tokenization environment by restricting values for candidate tokens to a set of values unique to each client, according to one embodiment. A client 100A requests 510 a unique set of allowable token values from a central token management system 110. The request may be sent, for instance, during the initialization of client 100A or responsive to receiving sensitive data to be tokenized. The central token management system 110 receives the request and generates 520 a set of allowable token values unique to the client 100A. In some embodiments, the central token management system 110 queries other clients communicatively coupled to the central token management system to identify a set of allowable token values unique to the client 100A (for instance, by eliminating any allowable token value assigned to another client from consideration). The central token management system 110 then sends 530 the generated set of unique allowable token values to the client 100A. For example, the central token management system 110 can assign the value range "21000000" to "21999999" to the client 100A, and can prevent any value within the range from being assigned to another client as a possible token value. The client 100 stores 540 the set of unique allowable token values for subsequent use in generating candidate tokens.

The client 100A receives 550 sensitive data to be tokenized, and queries 560 a token table associated with the client 100A with a portion of the sensitive data to determine if the token table includes a token mapped to the portion of sensitive data. If the token table includes a token mapped to the portion of the sensitive data, the sensitive data is tokenized 580 using the token to create tokenized data. If the token table does not include a token mapped to the portion of the sensitive data, the client 100A generates 570 a candidate token including a value within the unique set of allowable token tables stored at the client 100A and assigned by the central token management system 110. The candidate token and the portion of the sensitive data are stored 580 in the token table associated with the client 100A and the sensitive data is tokenized 590 using the candidate token to create tokenized data.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for tokenizing data comprising:
   generating, by a central token management system, a unique set of values for each of a plurality of clients communicatively coupled to the central token management system, wherein each unique set of values is generated by the central token management system for the plurality of clients to avoid collisions between token values generated by the plurality of clients based on the unique sets of values;
   providing, by the central token management system, each generated unique set of values to a corresponding client of the plurality of clients, each client configured to generate token values based on the unique set of values corresponding to the client; and
   providing, by the central token management, an additional unique set of values to a client of the plurality of clients in response to receiving a request for the additional unique set of values from the client.

2. The method of claim 1, wherein a client, in response to a determination that a token table associated with the client includes a token value mapped to a value of a selected portion of the data, is configured to tokenize the data using the token value mapped to the value of the selected portion of the data.

3. The method of claim 1, wherein a client, in response to a determination that a token table associated with the client includes a token value for each value in the unique set of values corresponding to the client, is configured to request an additional unique set of values from the central token management system.

4. The method of claim 1, wherein the data is one of: a credit card number, a bank account number, a social security number, a driver's license number, and a passport number.

5. The method of claim 1, wherein each unique set of values comprises a numeric range of values.

6. The method of claim 1, wherein the central token management system is further configured to periodically generate and provide a new unique set of values to each client.

7. A non-transitory computer-readable medium storing executable computer instructions for tokenizing data, the instructions, when executed by a hardware processor, configured to perform steps comprising:
   generating, by a central token management system, a unique set of values for each of a plurality of clients communicatively coupled to the central token management system, wherein each unique set of values is generated by the central token management system for the plurality of clients to avoid collisions between token values generated by the plurality of clients based on the unique sets of values;
   providing, by the central token management system, each generated unique set of values to a corresponding client of the plurality of clients, each client configured to generate token values based on the unique set of values corresponding to the client; and
   providing, by the central token management, an additional unique set of values to a client of the plurality of clients in response to receiving a request for the additional unique set of values from the client.

8. The computer-readable medium of claim 7, wherein a client, in response to a determination that a token table associated with a client includes a token value mapped to a value of a selected portion of the data, is configured to tokenize the data using the token value mapped to the value of the selected portion of the data.

9. The computer-readable medium of claim 7, wherein a client, in response to a determination that a token table associated with the client includes a token value for each value in the unique set of values corresponding to the client, is configured to request an additional unique set of values from the central token management system.

10. The computer-readable medium of claim 7, wherein the data is one of: a credit card number, a bank account number, a social security number, a driver's license number, and a passport number.

11. The computer-readable medium of claim 7, wherein each unique set of values comprises a numeric range of values.

12. The computer-readable medium of claim 7, wherein the central token management system is further configured to periodically generate and provide a new unique set of values to each client.

13. A system for tokenizing data comprising:
a plurality of client devices; and
a central token management system communicatively coupled to the plurality of client devices and configured to perform steps comprising:
generating, by a central token management system, a unique set of values for each of a plurality of clients communicatively coupled to the central token management system, wherein each unique set of values is generated by the central token management system for the plurality of clients to avoid collisions between token values generated by the plurality of clients based on the unique sets of values;
providing, by the central token management system, each generated unique set of values to a corresponding client of the plurality of clients, each client configured to generate token values based on the unique set of values corresponding to the client; and
providing, by the central token management, an additional unique set of values to a client of the plurality of clients in response to receiving a request for the additional unique set of values from the client.

14. The system of claim 13, wherein a client device, in response to a determination that a token table associated with the client device includes a token value mapped to a value of a selected portion of the data, is configured to tokenize the data using the token value mapped to the value of the selected portion of the data.

15. The system of claim 13, wherein a client device, in response to a determination that a token table associated with the client device includes a token value for each value in the unique set of values corresponding to the client, is configured to request an additional unique set of values from the central token management system.

16. The system of claim 13, wherein the data is one of: a credit card number, a bank account number, a social security number, a driver's license number, and a passport number.

17. The system of claim 13, wherein each unique set of values comprises a numeric range of values.

18. The system of claim 13, wherein the central token management system is further configured to periodically generate and provide a new unique set of values to each client device.

* * * * *